United States Patent
Xu et al.

(10) Patent No.: US 10,325,181 B2
(45) Date of Patent: Jun. 18, 2019

(54) IMAGE CLASSIFICATION METHOD, ELECTRONIC DEVICE, AND STORAGE MEDIUM

(71) Applicants: TENCENT TECHNOLOGY (SHENZHEN) COMPANY LIMITED, Shenzhen (CN); TSINGHUA UNIVERSITY, Beijing (CN)

(72) Inventors: Kun Xu, Shenzhen (CN); Xiaowei Guo, Shenzhen (CN); Feiyue Huang, Shenzhen (CN); Ruixin Zhang, Shenzhen (CN); Juhong Wang, Shenzhen (CN); Shimin Hu, Shenzhen (CN); Bin Liu, Shenzhen (CN)

(73) Assignees: TENCENT TECHNOLOGY (SHENZHEN) COMPANY LIMITED, Shenzhen (CN); TSINGHUA UNIVERSITY, Beijing (CN)

( * ) Notice: Subject to any disclaimer, the term of this patent is extended or adjusted under 35 U.S.C. 154(b) by 111 days.

(21) Appl. No.: 15/703,027

(22) Filed: Sep. 13, 2017

(65) Prior Publication Data
US 2018/0012107 A1 Jan. 11, 2018

Related U.S. Application Data

(63) Continuation of application No. PCT/CN2016/083064, filed on May 23, 2016.

(30) Foreign Application Priority Data

Dec. 11, 2015 (CN) .......................... 2015 1 0921073

(51) Int. Cl.
*G06K 9/62* (2006.01)
*G06K 9/46* (2006.01)
(Continued)

(52) U.S. Cl.
CPC ............. *G06K 9/6267* (2013.01); *G06K 9/46* (2013.01); *G06K 9/6262* (2013.01);
(Continued)

(58) Field of Classification Search
CPC ...... G06K 9/6267; G06K 9/46; G06K 9/6262; G06K 9/6273; G06K 9/6292; G06K 9/66; G06N 3/0454
See application file for complete search history.

(56) References Cited

U.S. PATENT DOCUMENTS 7,274,822 B2   9/2007  Zhang et al.
2005/0105780 A1  5/2005  Ioffe
(Continued)

FOREIGN PATENT DOCUMENTS

| CN | 103927510 A | 7/2014 |
| CN | 104156464 A | 11/2014 |
| JP | 2001331799 A | 11/2001 |

OTHER PUBLICATIONS

Carreira et al, "Object Recognition by Sequential Figure-Ground Ranking", 2012, Int J Comput Vis (2012) 98, pp. 243-262 (Year: 2012).*

(Continued)

*Primary Examiner* — David F Dunphy
(74) *Attorney, Agent, or Firm* — Anova Law Group, PLLC (57) ABSTRACT

An image classification method is provided. The method includes: inputting a to-be-classified image into a plurality of neural network models; obtaining data output by multiple non-input layers specified by each neural network model to generate a plurality of image features corresponding to the plurality of neural network models; respectively inputting the plurality of corresponding image features into linear classifiers, each of the linear classifiers being trained by one (Continued)

of the plurality of neural network models for determining whether an image belongs to a preset class; obtaining, using each neural network model, a corresponding probability that the to-be-classified image comprises an object image of the preset class; and determining, according to each obtained probability, whether the to-be-classified image includes the object image of the preset class.

18 Claims, 6 Drawing Sheets

(51) Int. Cl.
    *G06K 9/66*     (2006.01)
    *G06N 3/04*     (2006.01)
(52) U.S. Cl.
    CPC ......... *G06K 9/6273* (2013.01); *G06K 9/6292* (2013.01); *G06K 9/66* (2013.01); *G06N 3/0454* (2013.01)

(56) References Cited

U.S. PATENT DOCUMENTS

| | | | |
|---|---|---|---|
| 2016/0283864 A1* | 9/2016 | Towal | G06K 9/6272 |
| 2017/0140247 A1* | 5/2017 | Yoo | G06K 9/00067 |
| 2018/0032844 A1* | 2/2018 | Yao | G06K 9/00362 |
| 2018/0144243 A1* | 5/2018 | Hsieh | G06N 3/08 |

OTHER PUBLICATIONS

Sermanet et al, "OverFeat: Integrated Recognition, Localization and Detection using Convolutional Networks", 2013, arXiv preprint arXiv:1312.6229, 16 pages (Year: 2013).*

The World Intellectual Property Organization (WIPO) International Search Report for PCT/CN2016/083064 dated Aug. 29, 2016 5 Pages (including translation).

* cited by examiner

IMAGE CLASSIFICATION METHOD, ELECTRONIC DEVICE, AND STORAGE MEDIUM

CROSS-REFERENCES TO RELATED APPLICATIONS

This application is a continuation application of PCT Patent Application No. PCT/CN2016/083064, filed on May 23, 2016, which claims priority to Chinese Patent Application No. 201510921073.9, entitled "IMAGE CLASSIFICATION METHOD AND APPARATUS" filed with the Patent Office of China on Dec. 11, 2015, the entire contents of both of which are incorporated herein by reference.

FIELD OF THE TECHNOLOGY

The present disclosure relates to the field of computer visual technologies, and in particular, to an image classification method, an electronic device, and a storage medium.

BACKGROUND OF THE DISCLOSURE

An image classification method is an image processing method for distinguishing objects of different classes according to different features reflected in image information and specifically, is using a computer to perform quantitative analysis on an image to classifying the image or each pixel or region in the image into one of several classes to replace visual interpretation of a person. After the image is classified, various applications, such as image retrieval, video surveillance, and image-related semantic analysis, may be further performed according to a classification result.

Currently, a neural network model may be used to implement relatively accurate image classification. However, with continuous expansion and refinement of image classification applications, requirements on accuracy of image classification are continuously raised. Therefore, how to improve accuracy of image classification is an important problem that needs to be resolved currently.

SUMMARY

According to various embodiments of the present application, an image classification method capable of improving accuracy of image classification, an electronic device, and a storage medium are provided.

An image classification method includes: inputting a to-be-classified image into a plurality of neural network models; obtaining data output by multiple non-input layers specified by each neural network model to generate a plurality of image features corresponding to the plurality of neural network models; respectively inputting the plurality of corresponding image features into linear classifiers, each of the linear classifiers being trained by one of the plurality of neural network models for determining whether an image belongs to a preset class; obtaining, using each neural network model, a corresponding probability that the to-be-classified image comprises an object image of the preset class; and determining, according to each obtained probability, whether the to-be-classified image includes the object image of the preset class.

An electronic device includes a memory and a processor, the memory storing instructions, which, when being executed by the processor, cause the processor to perform the following steps: inputting a to-be-classified image into a plurality of neural network models; obtaining data output by multiple non-input layers specified by each neural network model to generate a plurality of image features corresponding to the plurality of neural network models; respectively inputting the plurality of corresponding image features into linear classifiers, each of the linear classifiers being trained by one of the plurality of neural network models for determining whether an image belongs to a preset class; obtaining, using each neural network model, a corresponding probability that the to-be-classified image comprises an object image of the preset class; and determining, according to each obtained probability, whether the to-be-classified image includes the object image of the preset class.

A computer readable non-volatile storage mediums store computer readable instructions, which, when being executed by one or more processors, cause the one or more processors to perform the following steps: inputting a to-be-classified image into a plurality of neural network models; obtaining data output by multiple non-input layers specified by each neural network model to generate a plurality of image features corresponding to the plurality of neural network models; respectively inputting the plurality of corresponding image features into linear classifiers, each of the linear classifiers being trained by one of the plurality of neural network models for determining whether an image belongs to a preset class; obtaining, using each neural network model, a corresponding probability that the to-be-classified image comprises an object image of the preset class; and determining, according to each obtained probability, whether the to-be-classified image includes the object image of the preset class.

Details of one or more embodiments of the present disclosure are provided below in the accompanying drawings and descriptions. Other features, objectives, and advantages of this disclosure become apparent with reference to the specification, the accompanying drawings, and the claims.

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure more comprehensible, the present disclosure is described below in further detail with reference to the accompanying drawings and embodiments. It should be understood that the specific embodiments described therein are merely used for explaining the present disclosure instead of limiting the present disclosure.

Figure 1:
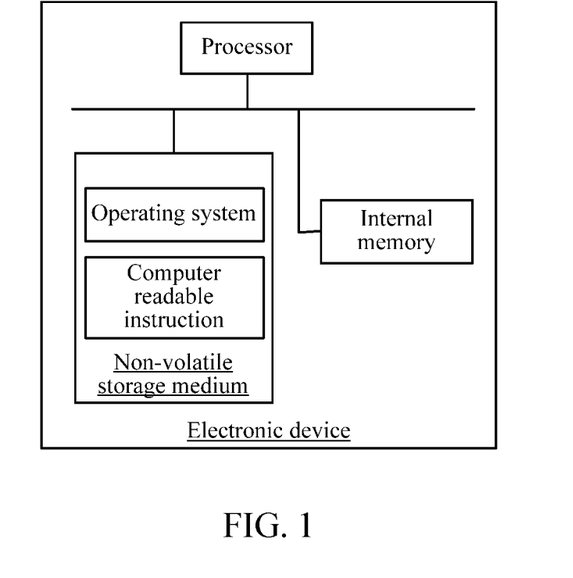
FIG. 1 is a schematic structural diagram of an electronic device for implementing an image classification method in an embodiment.

As shown in FIG. 1, in an embodiment, an electronic device for implementing an image classification method is provided, including a processor, a non-volatile storage medium, and an internal memory that are connected through a system bus. The processor has a calculation function and a function of controlling the electronic device to work, and the processor is configured to execute an image classification method. The non-volatile storage medium includes at least one of a magnetic storage medium, an optical storage medium, and a flash storage medium, and the non-volatile storage medium stores an operating system. The non-volatile storage medium and the internal memory may store a computer readable instruction, and when executed by the processor, the computer readable instruction may cause the processor to execute an image classification method.

Figure 2:
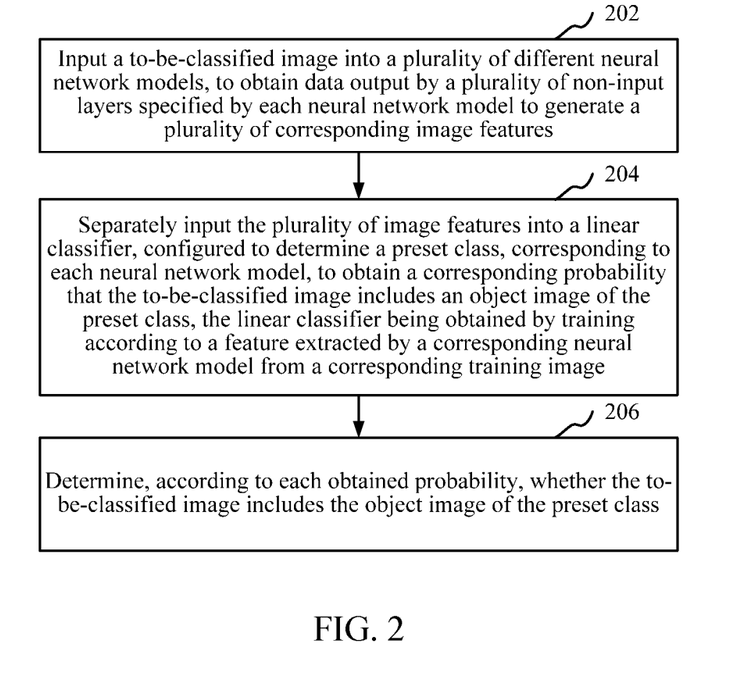
FIG. 2 is a flowchart of an image classification method in an embodiment.

As shown in FIG. 2, in an embodiment, an image classification method is provided. In this embodiment, applying the method to the electronic device shown in FIG. 1 is used as an example for description. The method specifically includes the following steps:

Step 202: Input a to-be-classified image into a plurality of different neural network models, to obtain data output by a plurality of non-input layers specified by each neural network model to generate a plurality of corresponding image features.

The to-be-classified image is an image that needs to be classified and may be carried in a picture preset format, and for example, the preset format may be the JPEG format, the PNG format, the BMP format, GIF format, or the like. The neural network model, also referred to as Artificial Neural Networks (ANNs), is a machine learning model simulating a brain structure. In the field of machine learning, a neural network is usually used to model a relatively complex task. Dimensions, including a depth and a width, of the neural network are all adjustable and depend on an application field and the scale of the problem. Because of a powerful expression capability, the neural network is widely used in application fields such as voice recognition, image classification, facial recognition, natural language processing, and advertising.

Figure 3:
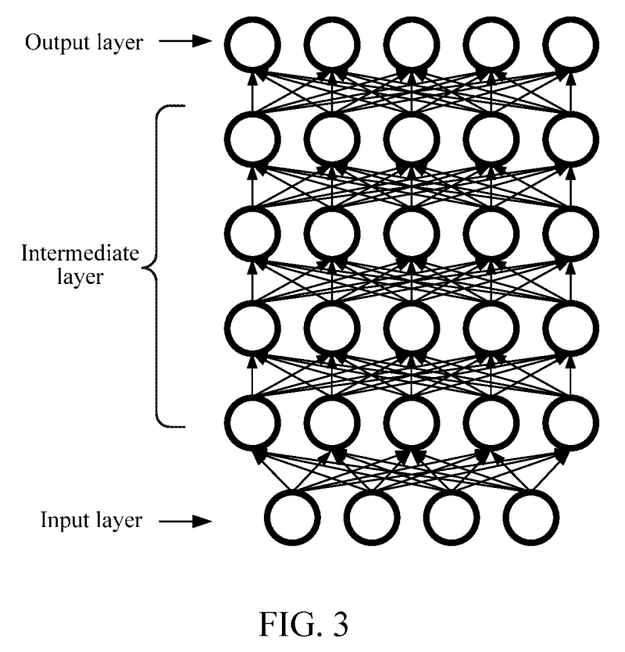
FIG. 3 is a schematic structural diagram of a simplified neural network model in a specific instance.

In the simplified neural network model as shown in FIG. 3, a structure of the neural network model includes a plurality of layers, the first layer is an input layer, the last layer is an output layer, there is no intermediate layer or a plurality of intermediate layers in the middle and each layer includes one or more nodes. Dimensions of the input layer depend on a quantity of input variables, and dimensions of the output layer depend on a quantity of classification classes. An implicit layer includes a plurality of neurons, and complexity and an expression capability of the neural network model may be adjusted by adjusting a quantity of neurons. Generally, a wider and/or deeper neural network has a stronger modeling capability.

A plurality of neural network models includes at least two neural network models, different neural network models are mainly trained by using different training sets, and the different training sets indicate that training images in the training sets are different. Certainly, existence of a small number of same training images in different training sets is also acceptable. The training image is an image whose class is known. Non-output layers of different neural network models may have a uniform architecture, and specifically, the non-output layers may include a same quantity of layers and have a same width. The architecture herein does not include a coefficient for connecting different layers. The non-output layer indicates an input layer and an intermediate layer, and the non-input layer indicates an intermediate layer and an output layer. The output layer includes a plurality of nodes.

Preferably, the neural network model may be a convolutional neural network model. In the convolutional neural network model, a connection relationship between neurons of two adjacent layers changes from original full connection to connection between each neuron and only a few neurons, and a connection coefficient (or referred to as a weight) is the same between neurons and is referred to as a shared convolution kernel or a shared weight. Such a connection manner similar to a convolution can greatly reduce a quantity of learned parameters, by means of which some features with invariance are learned, is very suitable for processing image data, and is used to further improve classification accuracy during image classification.

A to-be-classified image is input into output layers of a plurality of different neural network models to obtain data output by at least one layer in an intermediate layer and an output layer of each neural network model, preferably, data output by at least two layers in an intermediate layer and an output layer of each neural network model may be obtained, and a plurality of image features having one-to-one correspondence with each neural network model is generated according to the obtained data. An output layer of a neural network model may output a probability that a to-be-classified image belongs to a preset class, and each node of the output layer represents a preset class.

When data output by a non-input layer is obtained, the non-input layer is preferably selected in a direction from an output layer to an input layer, for example, the output layer and the last-but-one are selected, or the output layer, the last-but-one layer, and the last-but-two layer are selected.

Step 204: Respectively input the plurality of image features into linear classifiers, to obtain a corresponding probability that the to-be-classified image includes an object image of the preset class, each of the linear classifiers being trained by one of the plurality of neural network models for determining whether an image belongs to a preset class.

Specifically, for each preset class, each neural network model separately trains a linear classifier configured to determine the corresponding preset class, the linear classifier of the preset class is obtained, according to a training image whose true probability of including an object image of the preset class is known, after the neural network model corresponding to the linear classifier extracts image features. During image feature extraction, if it is needed to determine whether a to-be-classified image includes an object image of a specific preset class, a plurality of image features may be separately input to a linear classifier, configured to determine a specific preset class, corresponding to each neural network model; if it is needed to determine which preset class or preset classes are included by a to-be-classified image, a plurality of image features may be separately input into all linear classifiers corresponding to each neural network model, and each linear classifier is configured to determine a preset class. Including an object image of a preset class is, for example, including an image of a television, including an image of a dog, including an image of human, or the like.

Figure 4:
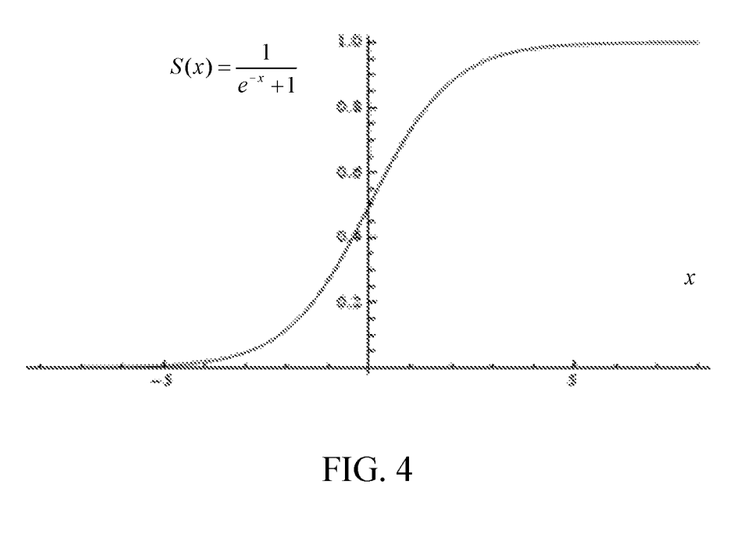
FIG. 4 is a schematic diagram of a curve of a mapping function in an embodiment.

A result output by a linear classifier may be a real number range, and a mapping function whose independent variable is a real number set and whose dependent variable is [0, 1] may be used for mapping the result output by the linear classifier into a probability that a to-be-classified image includes an object image of a preset class. The linear classifier is a linear classifier based on a Support Vector Machine (SVM). The dependent variable of the mapping function is positively correlated to the independent variable of the mapping function, that is, the dependent variable increases as the independent variable increases and decreases as the independent variable decreases. For example, a Sigmoid function may be used as the mapping function, and the Sigmoid function is specifically $$S(x) = \frac{1}{e^{-x}+1},$$

where e is a natural base number, x is an independent variable, S(x) is a dependent variable. A curve of the Sigmoid function is shown in FIG. 4. The mapping function may be integrated into the linear classifier to enable the linear classifier to directly output a probability that a to-be-classified image includes an object image of a preset class.

Step 206: Determine, according to each obtained probability, whether the to-be-classified image includes the object image of the preset class.

Specifically, an average or a weighted average may be obtained from probabilities obtained in step 204 to obtain a comprehensive probability, so as to determine whether the comprehensive probability is greater than or equal to a probability threshold of the corresponding preset class. If the comprehensive probability is greater than or equal to the probability threshold, it is determined that the to-be-classified image includes the object image of the preset class; if the comprehensive probability is less than the probability threshold, it is determined that the to-be-classified image does not include the object image of the preset class. For a weight of each probability when the weight average is calculated, several weight combinations may be prepared in advance, image classification accuracy under each weight combination is verified by using a validation set, and a weight combination with the highest image classification accuracy is selected as a weight of each probability when the weight average is calculated.

In the foregoing image classification method, features of a to-be-classified image are extracted by using data output by a plurality of non-input layers of a neural network model, so as to express the features of the image more accurately. The image features are further input into a corresponding linear classifier, configured to determine a preset class, corresponding to a neural network model, and a probability obtained by using a result output by the linear classifier can more accurately reflect a probability that the to-be-classified image includes an object image of the preset class. Accuracy of image classification may be further improved by integrating probabilities corresponding to linear classifiers, configured to determine preset classes, respectively corresponding to different neural network models.

Figure 5:
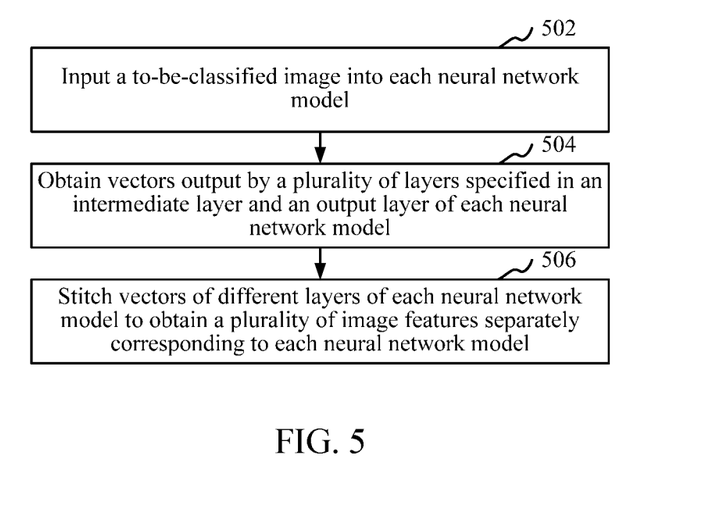
FIG. 5 is a flowchart of a step of inputting a to-be-classified image into a plurality of different neural network models to obtain data output by a plurality of non-input layers specified by each neural network model to generate a plurality of corresponding image features.

As shown in FIG. 5, in an embodiment, step 202 specifically includes the following steps:

Step 502: Input a to-be-classified image into each neural network model.

In an embodiment, step 502 includes: separately inputting a to-be-classified image into each neural network model according to a plurality of sizes. Images of the plurality of sizes are all obtained by scaling up or down the to-be-classified image at a same aspect ratio. For example, the to-be-classified image may be scaled down or up into images of three sizes, whose shorter sides are 256, 384, and 512, which are separately input into each neural network model.

Step 504: Obtain vectors output by a plurality of layers specified in an intermediate layer and an output layer of each neural network model.

A plurality of layers specified in an intermediate layer and an output layer of each neural network model indicates that at least two layers that are specified in advance are selected from a set of layers constituted by the intermediate layer and the output layer. For example, vectors output by the output layer, the last-but-one layer, and the last-but-two layer of each neural network model may be obtained. A vector output by each layer is a vector with a fixed length.

Step 506: Stitch vectors of different layers of each neural network model to obtain a plurality of image features separately corresponding to each neural network model. As used herein stitching vectors may refer to combining or merging vectors.

Specifically, according to a predetermined stitching sequence, vectors of different layers of each neural network model are stitched to obtain image features having one-to-one correspondence with neural network models. A quantity of the obtained image features is consistent with a quantity of the neural network models.

In an embodiment, step 506 specifically includes: stitching vectors of different layers corresponding to images of a same size of each neural network model and averaging vectors corresponding to images of different sizes, to obtain a plurality of image features separately corresponding to each neural network model.

Specifically, after images of different sizes are input into a neural network model, vectors output by a same layer of each neural network model have a fixed length, and features of the images of different sizes may be integrated in a manner of obtaining an average. Moreover, vectors output by different layers of each neural network model usually have different lengths, and features of images of different layers may be integrated in a stitching manner. Vectors of different layers corresponding to images of a same size of each neural network model are stitched, and vectors corresponding to images of different sizes are averaged, which can be implemented without defining a sequential order. The image features obtained finally can accurately express the features of the to-be-classified image.

In this embodiment, vectors output by a plurality of layers in the non-input layer of the neural network model are used to generate image features, so that the image features can better express features of the to-be-classified image, which is beneficial to obtaining better accuracy of classification.

In an embodiment, the image classification method further includes: clearing up a coefficient of an output layer of an original neural network model trained by using a training set, adjusting the output layer to adapt to another training set, and performing retraining, by using the another training set, to obtain a retrained neural network model.

A training set is a training set that is used when an original neural network model is trained and includes several training image whose true probabilities of including an object image of the preset class are known. Another training set is a training set different from the training set is used when an original neural network model is trained. Different training sets have different quantities of preset classes. Therefore, it is needed to adjust nodes of the output layer according to a quantity of preset classes of another training set and clear up the coefficient of the output layer to perform retraining.

A neural network model that is trained by using an ImageNet training set and that is published by the VGG laboratory of University of Oxford may be used as the original neural network model. In another embodiment, another open neural network model, such as an open-source neural network model of the Google Company, may also be used. ImageNet is a computer visual system recognition project, is established by computer scientists in the U.S.A by simulating the recognition system of human, and is configured to establish a depth learning model of recognizing an object from a picture.

The ImageNet training set used for training the original neural network model has 1000 classes, and the scale of the output layer coefficient is 4096*1000 (4096 is an output quantity of the last-but-one layer). Another data set does not necessarily include 1000 classes. Assuming that there are 20 classes, the scale of the coefficient of the output layer is 4096*20. Therefore, the output layer should be adjusted to adapt to another training set to perform retraining. During retraining, the Fully Convolutional Networks (FCN) (refer to Fully Convolutional Networks for Semantic Segmentation, arxiv:1411.4038v2) algorithm may be used for retraining.

In an embodiment, when the neural network model is retrained, the coefficient of the output layer of the neural network model whose output layer has been adjusted is initialized, each training image in a corresponding training set is scaled into a same size to be input into the neural network model, and the output layer outputs a probability of including the object image of the preset class. The true probability may be a proportion of the object image of the preset class to the corresponding training image. The output probability is compared with the true probability of the training image to adjust the coefficient of the retrained neural network model, so that a difference between the probability output by the output layer and the corresponding true probability is reduced, and the training is finally completed.

When each training image in the corresponding training set is scaled into a same size to be input into the neural network model, if the aspect ratios are different, the scaled image is traversed by using a square with a shorter side as a side length to obtain a sub-image to input it into the neural network model until all pixels of the scaled image are traversed. For example, the training image may be scaled to 256 according to the shorter side, and according to the size of the longer side, sub-images of 256*256 are input multiple times at an interval of 16 pixels each time until all pixels of the scaled image are traversed.

In an embodiment, when a neural network model is retrained, density probability spatial distribution of an object image of each preset class of a training image may be obtained based on the OverFeat algorithm. True density probability spatial distribution may be calculated according to a true position of the object image in the training image. The back propagation gradient may be calculated according to the density probability spatial distribution obtained by using the OverFeat algorithm and the true density probability spatial distribution, so as to adjust a coefficient of the retrained neural network model according to the back propagation gradient, so that the difference between the probability output by the output layer and the corresponding true probability is reduced.

For example, assuming that the coefficient of the retrained neural network model is a vector X, the input training image is I, the probability output by the output layer is y(X, I), y can be calculated if X and I are given, and the true probability y' is known, it is needed to adjust the vector X to make y close to y' as much as possible. Hence, X is optimized to minimize the cost function $E=|y-y'|^2$. For E, a partial derivative about X is obtained, to obtain a gradient direction $\Delta X$, and a value of X is adjusted in a direction $-\Delta X$ opposite to the gradient direction $\Delta X$, to reduce E.

Figure 6:
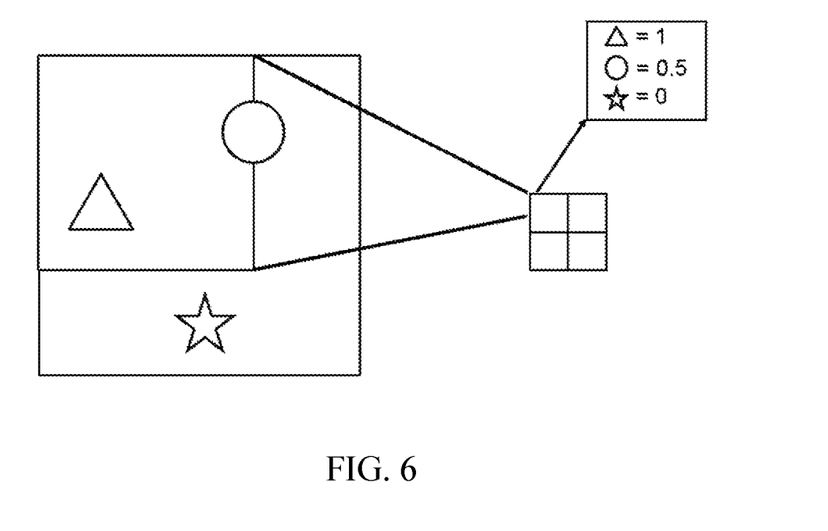
FIG. 6 is a schematic diagram of outputting a probability matrix when inputting a training image larger than a standard size during retraining a neural network model in an embodiment.

Assuming that a standard size of the input image of the retrained neural network model is 224*224, if a training image larger than the standard size is input, the output layer outputs a probability matrix of the corresponding step class. For example, if an image of 256*256 is input, a probability matrix of 2*2 is obtained, and each probability in the matrix corresponds to a sub-image of the input training image. As shown in FIG. 6, a value on the upper left corner of the probability matrix only depends on a sub-image of a size of 224*224 on the upper left corner of the training image. The probability in the probability matrix may be a proportion of a part of the object image of the preset class in a corresponding sub-image to the entire object image. For example, a triangle in a sub-image of a size of 224*224 on the upper left corner of FIG. 6 is completely located inside the sub-image, and a corresponding probability is 1; a pentagram is not in the sub-image, so that a corresponding probability is 0; a half of a circle is in the sub-image, so that a corresponding probability is 0.5.

In this embodiment, by adjusting and retraining an existing neural network model, a neural network model needed for image classification may be obtained by rapid training, so that the time needed for training is greatly saved.

Figure 7:
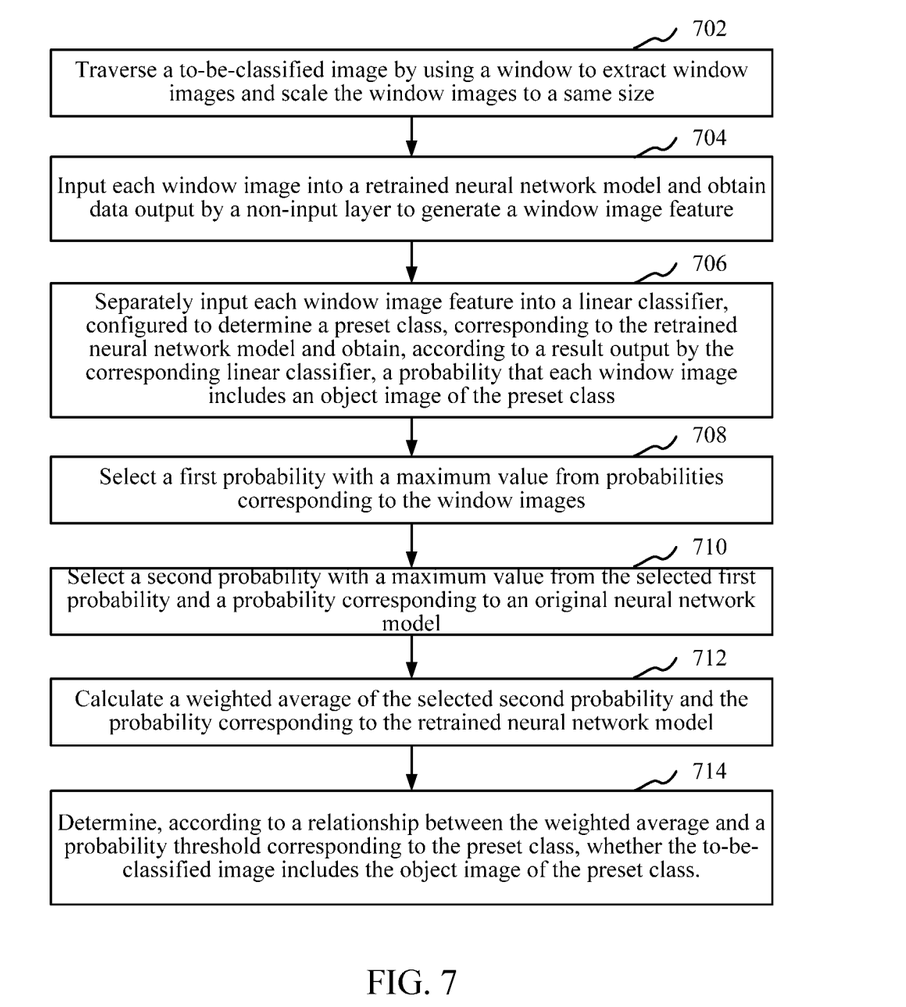
FIG. 7 is a flowchart of determining whether a to-be-classified image includes an object image of a preset class according to each obtained probability in an embodiment.

As shown in FIG. 7, in an embodiment, step 206 specifically includes the following steps:

Step 702: Traverse the to-be-classified image by using a window to extract window images and scale the window images to a same size.

Specifically, a Selective Search algorithm is applied to the to-be-classified image to extract 100 window images from the to-be-classified image, and the 100 window images are uniformly scaled to a size of 256*256. The scaled size should satisfy the size required for the input image of the neural network model.

Step 704: Input each window image into a retrained neural network model and obtain data output by the non-input layer to generate a window image feature.

Specifically, each window image may be input into the retrained neural network model, vectors output by a plurality of layers specified in the intermediate layer and the output layer may be obtained, and vectors of different layers are stitched to obtain a window image feature.

In an embodiment, window images may be separately input into the retrained neural network model according to a plurality of sizes, vectors of different layers corresponding to images of a same size are stitched, and vectors corresponding to images of different sizes are averaged, so as to obtain a window image feature.

Step 706: Separately input each window image feature into a linear classifier, configured to determine a preset class, corresponding to the retrained neural network model and obtain, according to a result output by the corresponding linear classifier, a probability that each window image includes an object image of the preset class.

Step 708: Select a first probability with a maximum value from probabilities corresponding to the window images. Specifically, herein, a maximum probability selected from probabilities corresponding to the window images is recorded as P3, a probability corresponding to the original neural network model is recorded as P2, and a probability corresponding to the retrained neural network model is P1.

Step 710: Select a second probability with a maximum value from the selected first probability and a probability corresponding to an original neural network model. Specifically, a maximum probability selected from P2 and P3 is recorded as max(P2, P3).

Step 712: Calculate a weighted average of the selected second probability and the probability corresponding to the retrained neural network model.

Specifically, a weighted average of P1 and max(P2, P3) is calculated. The weight of P1 and max(P2, P3) may be determined by verifying image classification accuracy by using a validation set. Specifically, several weight combinations, such as 0.1 and 0.9, 0.2 and 0.8, as well as 0.3 and 0.7, may be prepared in advance, and image classification accuracy under different weight combinations is verified by using a validation set, so as to select a weight combination having the highest image classification accuracy as the weight combination in step 712 for calculating a weighted average. The validation set includes several sets of images whose true probabilities of including an object image of a preset class are known.

Step 714: Determine, according to a relationship between the weighted average and a probability threshold corresponding to the preset class, whether the to-be-classified image includes the object image of the preset class.

Specifically, the weighted average is compared with a probability threshold of the preset class, and if the weighted average is greater than or equal to the probability threshold of the preset class, it is determined that the to-be-classified image includes an object image of the preset class; and if the weighted average is less than the probability threshold of the preset class, it is determined that the to-be-classified image does not include an object image of the preset class. For example, the probability threshold may be 0.5.

In an embodiment, when the size of the to-be-classified image is greater than the size of the training image, the to-be-classified image may be divided into several sub-images that can partially overlap, and a weighted average of each sub-image is obtained separately through step 202, step 204, and step 702 to step 712, the weighted average indicates a comprehensive probability of each neural network model, and the comprehensive probability of each sub-image constitutes probability spatial distribution. A maximum probability passing through the probability spatial distribution may present a probability that the whole to-be-classified image includes the object image of the preset class, and object images of which preset classes are included by the to-be-classified image can be determined by using maximum probabilities of different preset classes.

In this embodiment, it is considered that determination of some classes depends on context information, for example, the sea as a background is usually needed to determine a boat, so that a value of the corresponding P2 is greater than that of P3. Moreover, determination of some classes does not depend on the context information, so that a value of P3 is greater than that of P2. Moreover, if an object image of the preset class is not included, both P2 and P3 are relatively low. Therefore, as long as either P2 or P3 is very high, it could be basically determined that the possibility that the to-be-classified image includes an object image of the preset class is very high, so that image classification accuracy may be further improved.

Figure 8:
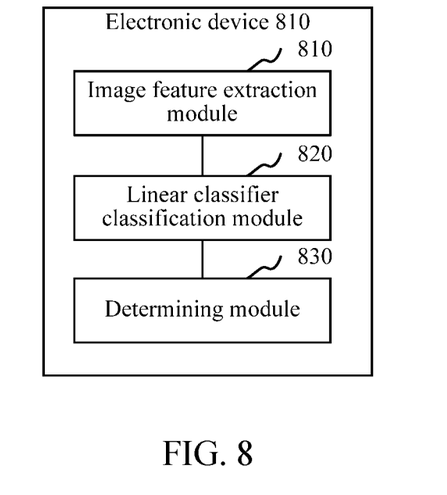
FIG. 8 is a structural block diagram of an electronic device in an embodiment.

As shown in FIG. 8, in an embodiment, an electronic device 800 is provided, and an internal structure of the electronic device 800 may correspond to a structure of the electronic device as shown in FIG. 1, and all or some of the modules below may be implemented by using software, hardware, or a combination thereof. The electronic device 800 includes an image feature extraction module 810, a linear classifier classification module 820, and a determining module 830.

The image feature extraction module 810 is configured to input a to-be-classified image into a plurality of different neural network models, to obtain data output by a plurality of non-input layers specified by each neural network model to generate a plurality of corresponding image features.

The to-be-classified image is an image that needs to be classified and may be carried in a picture preset format, and for example, the preset format may be the JPEG format, the PNG format, the BMP format, GIF format, or the like. The neural network model, also referred to as Artificial Neural Networks (ANNs), is a machine learning model simulating a brain structure. In the field of machine learning, a neural network is usually used to model a relatively complex task. Dimensions, including a depth and a width, of the neural network are all adjustable and depend on an application field and the scale of the problem. Because of a powerful expression capability, the neural network is widely used in application fields such as voice recognition, image classification, facial recognition, natural language processing, and advertising.

In the simplified neural network model as shown in FIG. 3, a structure of the neural network model includes a plurality of layers, the first layer is an input layer, the last layer is an output layer, there is no intermediate layer or a plurality of intermediate layers in the middle and each layer includes one or more nodes. Dimensions of the input layer depend on a quantity of input variables, and dimensions of the output layer depend on a quantity of classification classes. An implicit layer includes a plurality of neurons, and complexity and an expression capability of the neural network model may be adjusted by adjusting a quantity of neurons. Generally, a wider and/or deeper neural network has a stronger modeling capability.

A plurality of neural network models includes at least two neural network models, different neural network models are mainly trained by using different training sets, and the different training sets indicate that training images in the training sets are different. Certainly, existence of a small number of same training images in different training sets is also acceptable. The training image is an image whose class is known. Non-output layers of different neural network models may have a uniform architecture, and specifically, the non-output layers may include a same quantity of layers and have a same width. The architecture herein does not include a coefficient for connecting different layers. The non-output layer indicates an input layer and an intermediate layer, and the non-input layer indicates an intermediate layer and an output layer. The output layer includes a plurality of nodes.

Preferably, the neural network model may be a convolutional neural network model. In the convolutional neural network model, a connection relationship between neurons of two adjacent layers changes from original full connection to connection between each neuron and only a few neurons, and a connection coefficient is the same between neurons and is referred to as a shared convolution kernel or a shared weight. Such a connection manner similar to a convolution can greatly reduce a quantity of learned parameters, by means of which some features with invariance are learned, is very suitable for processing image data, and is used to further improve classification accuracy during image classification.

The image feature extraction module 810 is configured to input a to-be-classified image into output layers of a plurality of different neural network models to obtain data output by at least one layer in an intermediate layer and an output layer of each neural network model, where preferably, data output by at least two layers in an intermediate layer and an output layer of each neural network model may be obtained, and a plurality of image features having one-to-one correspondence with each neural network model is generated according to the obtained data. An output layer of a neural network model may output a probability that a to-be-classified image belongs to a preset class, and each node of the output layer represents a preset class.

When data output by a non-input layer is obtained by the image feature extraction module 810, the non-input layer is preferably selected in a direction from an output layer to an input layer, for example, the output layer and the last-but-one are selected, or the output layer, the last-but-one layer, and the last-but-two layer are selected.

The linear classifier classification module 820 is configured to separately input the plurality of image features into a linear classifier, configured to determine a preset class, corresponding to each neural network model, to obtain a corresponding probability that the to-be-classified image includes an object image of the preset class, the linear classifier being obtained by training according to a feature extracted by a corresponding neural network model from a corresponding training image.

Specifically, for each preset class, each neural network model separately trains a linear classifier configured to determine the corresponding preset class, the linear classifier of the preset class is obtained, according to a training image whose true probability of including an object image of the preset class is known, after the neural network model corresponding to the linear classifier extracts image features. If it is needed to determine whether a to-be-classified image includes an object image of a specific preset class, a plurality of image features may be separately input to a linear classifier, configured to determine a specific preset class, corresponding to each neural network model; if it is needed to determine which preset class or preset classes are included by a to-be-classified image, a plurality of image features may be separately input into all linear classifiers corresponding to each neural network model, and each linear classifier is configured to determine a preset class. Including an object image of a preset class is, for example, including an image of a television, including an image of a dog, including an image of human, or the like.

A result output by a linear classifier may be a real number range, and a mapping function whose independent variable is a real number set and whose dependent variable is [0, 1] may be used for mapping the result output by the linear classifier into a probability that a to-be-classified image includes an object image of a preset class. The dependent variable of the mapping function is positively correlated to the independent variable of the mapping function, that is, the dependent variable increases as the independent variable increases and decreases as the independent variable decreases. For example, an Sigmoid function may be used as the mapping function, and the Sigmoid function is specifically $$S(x) = \frac{1}{e^{-x}+1},$$

where e is a natural base number, x is an independent variable, S(x) is a dependent variable. The mapping function may be integrated into the linear classifier to enable the linear classifier to directly output a probability that a to-be-classified image includes an object image of a preset class.

The determining module 830 is configured to determine, according to each obtained probability, whether the to-be-classified image includes the object image of the preset class.

Specifically, an average or a weighted average may be obtained from probabilities obtained by the linear classifier classification module 820 to obtain a comprehensive probability, so as to determine whether the comprehensive probability is greater than or equal to a probability threshold of the corresponding preset class. If the comprehensive probability is greater than or equal to the probability threshold, it is determined that the to-be-classified image includes the object image of the preset class; if the comprehensive probability is less than the probability threshold, it is determined that the to-be-classified image does not include the object image of the preset class. For a weight of each probability when the weight average is calculated, several weight combinations may be prepared in advance, image classification accuracy under each weight combination is verified by using a validation set, and a weight combination with the highest image classification accuracy is selected as a weight of each probability when the weight average is calculated.

The electronic device 800 extracts features of a to-be-classified image by using data output by a plurality of non-input layers of a neural network model, so as to express the features of the image more accurately. The image features are further input into a corresponding linear classifier, configured to determine a preset class, corresponding to a neural network model, and a probability obtained by using a result output by the linear classifier can more accurately reflect a probability that the to-be-classified image includes an object image of the preset class. Accuracy of image classification may be further improved by integrating probabilities corresponding to linear classifiers, configured to determine preset classes, respectively corresponding to different neural network models.

Figure 9:
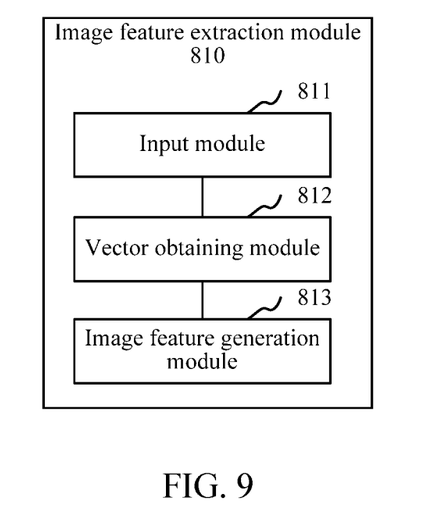
FIG. 9 is a structural block diagram of an image feature extraction module of an electronic device in an embodiment.

As shown in FIG. 9, in an embodiment, the image feature extraction module 810 includes an input module 811, a vector obtaining module 812, and an image feature generation module 813.

The input module 811 is configured to input a to-be-classified image into each neural network model.

The vector obtaining module 812 is configured to obtain vectors output by a plurality of layers specified in an intermediate layer and an output layer of each neural network model.

A plurality of layers specified in an intermediate layer and an output layer of each neural network model indicates that at least two layers that are specified in advance are selected from a set of layers constituted by the intermediate layer and the output layer. For example, vectors output by the output layer, the last-but-one layer, and the last-but-two layer of each neural network model may be obtained. A vector output by each layer is a vector with a fixed length.

The image feature generation module 813 is configured to stitch vectors of different layers of each neural network model to obtain a plurality of image features separately corresponding to each neural network model.

Specifically, the image feature generation module 813 is configured to stitch, according to a predetermined stitching sequence, vectors of different layers of each neural network model to obtain image features having one-to-one correspondence with neural network models. A quantity of the obtained image features is consistent with a quantity of the neural network models.

In this embodiment, vectors output by a plurality of layers in the non-input layer of the neural network model are used to generate image features, so that the image features can better express features of the to-be-classified image, which is beneficial to obtaining better accuracy of classification.

In an embodiment, the input module 811 is specifically configured to separately input a to-be-classified image into each neural network model according to a plurality of sizes. Images of the plurality of sizes are all obtained by scaling up or down the to-be-classified image at a same aspect ratio. For example, the to-be-classified image may be scaled down or up into images of three sizes, whose shorter sides are 256, 384, and 512, which are separately input into each neural network model.

The image feature generation module 813 is specifically configured to stitch vectors of different layers corresponding to images of a same size of each neural network model and average vectors corresponding to images of different sizes, to obtain a plurality of image features separately corresponding to each neural network model.

Specifically, after images of different sizes are input into a neural network model, vectors output by a same layer of each neural network model have a fixed length, and features of the images of different sizes may be integrated in a manner of obtaining an average. Moreover, vectors output by different layers of each neural network model usually have different lengths, and features of images of different layers may be integrated in a stitching manner. Vectors of different layers corresponding to images of a same size of each neural network model are stitched, and vectors corresponding to images of different sizes are averaged, which can be implemented without defining a sequential order. The image features obtained finally can accurately express the features of the to-be-classified image.

Figure 10:
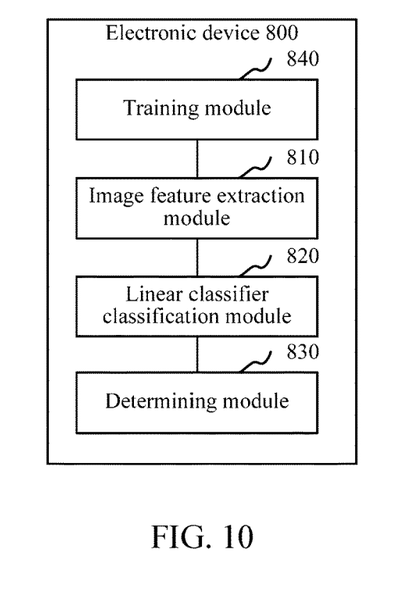
FIG. 10 is a structural block diagram of an electronic device in another embodiment.

As shown in FIG. 10, in an embodiment, the electronic device 800 further includes a training module 840, configured to clear up a coefficient of an output layer of an original neural network model trained by using a training set, adjust the output layer to adapt to another training set, and perform retraining, by using the another training set, to obtain a retrained neural network model.

A training set is a training set that is used when an original neural network model is trained and includes several training image whose true probabilities of including an object image of the preset class are known. Another training set is a training set different from the training set is used when an original neural network model is trained. Different training sets have different quantities of preset classes. Therefore, it is needed to adjust nodes of the output layer according to a quantity of preset classes of another training set and clear up the coefficient of the output layer to perform retraining.

A neural network model that is trained by using an ImageNet training set and that is published by the VGG laboratory of University of Oxford may be used as the original neural network model. In another embodiment, another open neural network model, such as an open-source neural network model of the Google Company, may also be used. ImageNet is a computer visual system recognition project, is established by computer scientists in the U.S.A by simulating the recognition system of human, and is configured to establish a depth learning model of recognizing an object from a picture.

The ImageNet training set used for training the original neural network model has 1000 classes, and the scale of the output layer coefficient is 4096*1000 (4096 is an output quantity of the last-but-one layer). Another data set does not necessarily include 1000 classes. Assuming that there are 20 classes, the scale of the coefficient of the output layer is 4096*20. Therefore, the output layer should be adjusted to adapt to another training set to perform retraining. During retraining, the FCN (Fully Convolutional Networks for Semantic Segmentation) algorithm may be used for retraining.

In an embodiment, when retraining the neural network model, the training module 840 may initialize the coefficient of the output layer of the neural network model whose output layer has been adjusted, and scale each training image in a corresponding training set into a same size to input it into the neural network model, where the output layer outputs a probability of including the object image of the preset class. The true probability may be a proportion of the object image of the preset class to the corresponding training image. The output probability is compared with the true probability of the training image to adjust the coefficient of the retrained neural network model, so that a difference between the probability output by the output layer and the corresponding true probability is reduced, and the training is finally completed.

When scaling each training image in the corresponding training set into a same size to input it into the neural network model, the training module 840, if the aspect ratios are different, traverses the scaled image by using a square with a shorter side as a side length to obtain a sub-image to input it into the neural network model until all pixels of the scaled image are traversed. For example, the training image may be scaled to 256 according to the shorter side, and according to the size of the longer side, sub-images of 256*256 are input multiple times at an interval of 16 pixels each time until all pixels of the scaled image are traversed.

In an embodiment, when retraining a neural network model, the training module 840 may obtain density probability spatial distribution of an object image of each preset class of a training image based on the OverFeat algorithm. True density probability spatial distribution may be calculated according to a true position of the object image in the training image. The back propagation gradient may be calculated according to the density probability spatial distribution obtained by using the OverFeat algorithm and the true density probability spatial distribution, so as to adjust a coefficient of the retrained neural network model according to the back propagation gradient, so that the difference between the probability output by the output layer and the corresponding true probability is reduced.

For example, assuming that the coefficient of the retrained neural network model is a vector X, the input training image is I, the probability output by the output layer is y(X, I), y can be calculated if X and I are given, and the true probability y' is known, it is needed to adjust the vector X to make y close to y' as much as possible. Hence, X is optimized to minimize the cost function E=|y-y'|². For E, a partial derivative about X is obtained, to obtain a gradient direction ΔX, and a value of X is adjusted in a direction −ΔX opposite to the gradient direction ΔX, to reduce E.

Assuming that a standard size of the input image of the retrained neural network model is 224*224, if a training image larger than the standard size is input, the output layer outputs a probability matrix of the corresponding step class. For example, if an image of 256*256 is input, a probability matrix of 2*2 is obtained, and each probability in the matrix corresponds to a sub-image of the input training image. As shown in FIG. 6, a value on the upper left corner of the probability matrix only depends on a sub-image of a size of 224*224 on the upper left corner of the training image. The probability in the probability matrix may be a proportion of a part of the object image of the preset class in a corresponding sub-image to the entire object image. For example, a triangle in a sub-image of a size of 224*224 on the upper left corner of FIG. 6 is completely located inside the sub-image, and a corresponding probability is 1; a pentagram is not in the sub-image, so that a corresponding probability is 0; a half of a circle is in the sub-image, so that a corresponding probability is 0.5.

In this embodiment, by adjusting and retraining an existing neural network model, a neural network model needed for image classification may be obtained by rapid training, so that the time needed for training is greatly saved.

Figure 11:
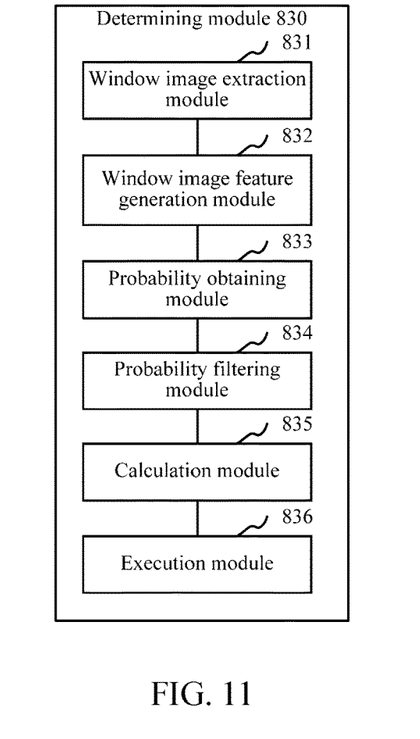
FIG. 11 is a structural block diagram of a determining module of an electronic device in an embodiment.

As shown in FIG. 11, in an embodiment, the determining module 830 includes: a window image extraction module 831, a window image feature generation module 832, a probability obtaining module 833, a probability filtering module 834, a calculation module 835 and an execution module 836.

The window image extraction module 831 is configured to traverse the to-be-classified image by using a window to extract window images and scale the window images to a same size.

Specifically, the a window image extraction module 831 may be configured to apply the Selective Search algorithm to the to-be-classified image to extract 100 window images from the to-be-classified image, and uniformly scale the 100 window images to a size of 256*256. The scaled size should satisfy the size required for the input image of the neural network model.

The window image feature generation module 832 is configured to input each window image into the retrained neural network model and obtain data output by the non-input layer to generate a window image feature.

Specifically, the window image feature generation module 832 may input each window image into the retrained neural network model, obtain vectors output by a plurality of layers specified in the intermediate layer and the output layer, and stitch vectors of different layers to obtain a window image feature.

In an embodiment, the window image feature generation module 832 may separately input window images into the retrained neural network model according to a plurality of sizes, stitch vectors of different layers corresponding to images of a same size, and average vectors corresponding to images of different sizes, so as to obtain a window image feature.

The probability obtaining module 833 is configured to separately input each window image feature into a linear classifier, configured to determine a preset class, corresponding to the retrained neural network model and obtain, according to a result output by the corresponding linear classifier, a probability that each window image includes an object image of the preset class.

The probability filtering module 834 is configured to select a probability with a maximum value from probabilities corresponding to the window images, and select a probability with a maximum value from the selected probability and a probability corresponding to an original neural network model. Specifically, herein, a maximum probability selected from probabilities corresponding to the window images is recorded as P3, a probability corresponding to the original neural network model is recorded as P2, and a probability corresponding to the retrained neural network model is P1. Specifically, a maximum probability selected from P2 and P3 is recorded as max(P2, P3).

The calculation module 835 is configured to calculate a weighted average of the selected probability and the probability corresponding to the retrained neural network model.

Specifically, a weighted average of P1 and max(P2, P3) is calculated. The weight of P1 and max(P2, P3) may be determined by verifying image classification accuracy by using a validation set. Specifically, several weight combinations, such as 0.1 and 0.9, 0.2 and 0.8, as well as 0.3 and 0.7, may be prepared in advance, and image classification accuracy under different weight combinations is verified by using a validation set, so as to select a weight combination having the highest image classification accuracy as the weight combination in step 712 for calculating a weighted average. The validation set includes several sets of images whose true probabilities of including an object image of a preset class are known.

The execution module 836 is configured to determine, according to a magnitude relationship between the weighted average and a probability threshold corresponding to the preset class, whether the to-be-classified image includes the object image of the preset class.

Specifically, the execution module 836 compares the weighted average with a probability threshold of the preset class, if the weighted average is greater than or equal to the probability threshold of the preset class, determine that the to-be-classified image includes an object image of the preset class; and if the weighted average is less than the probability threshold of the preset class, determine that the to-be-classified image does not include an object image of the preset class. For example, the probability threshold may be 0.5.

In this embodiment, it is considered that determination of some classes depends on context information, for example, the sea as a background is usually needed to determine a boat, so that a value of the corresponding P2 is greater than that of P3. Moreover, determination of some classes does not depend on the context information, so that a value of P3 is greater than that of P2. Moreover, if an object image of the preset class is not included, both P2 and P3 are relatively low. Therefore, as long as either P2 or P3 is very high, it could be basically determined that the possibility that the to-be-classified image includes an object image of the preset class is very high, so that image classification accuracy may be further improved.

A person of ordinary skill in the art may understand that, all or a part of the processes of the foregoing method embodiments may be implemented by a computer program instructing relevant hardware. The foregoing program may be stored in a computer readable storage medium. When the program runs, the steps of the foregoing method embodiments are performed. The storage medium may be a nonvolatile storage medium, such as a magnetic disk, an optical disc, or a read-only memory (ROM), a random access memory (RAM), or the like.

Technical features of the foregoing embodiments may be combined randomly. To make descriptions brief, not all possible combinations of technical features in the embodiments are described. Therefore, as long as there is no contradiction between the combinations of technical features, they should all be considered as scopes disclosed in this description.

The foregoing embodiments only describe several implementation manners of the present disclosure, and their description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. An image classification method, comprising:
inputting a to-be-classified image into a plurality of neural network models;
obtaining data output by multiple non-input layers specified by each neural network model to generate a plurality of image features corresponding to the plurality of neural network models;
respectively inputting the plurality of corresponding image features into linear classifiers, each of the linear classifiers being trained by one of the plurality of neural network models for determining whether an image belongs to a preset class;
obtaining, using each neural network model, a corresponding probability that the to-be-classified image comprises an object image of the preset class; and
determining, according to each obtained probability, whether the to-be-classified image comprises the object image of the preset class.

2. The method according to claim 1, wherein generating the plurality of corresponding image features further comprises:
obtaining vectors outputted by the multiple non-input layers specified among one or more intermediate layer and an output layer of each neural network model; and
combining vectors of the multiple non-input layers of each neural network model to obtain the plurality of image features corresponding to the plurality of the neural network model.

3. The method according to claim 2, wherein:
inputting the to-be-classified image into the plurality of neural network model comprises:
respectively inputting the to-be-classified image in multiple scales into each neural network model; and
combining the vectors of the multiple non-input layers further comprises:
respectively combining the vectors of the multiple non-input layers of one of the neural network models corresponding to the to-be-classified image at each scale to obtain combined vectors corresponding to the multiple scales; and
averaging the combined vectors corresponding to the multiple scales, to obtain one of the plurality of image features corresponding to one of the plurality of the neural network models.

4. The method according to claim 1, further comprising:
clearing up a coefficient of an output layer of a first neural network model trained by using a first training set, adjusting the output layer to adapt to a second training set, and performing retraining, by using the second training set, to obtain a retrained neural network model.

5. The method according to claim 4, wherein obtaining the corresponding probability that the to-be-classified image comprises the object image of the preset class further comprises:
traversing the to-be-classified image by using a window to extract window images and scaling the window images to a same size;
inputting each window image into the retrained neural network model and obtaining data output by the non-input layers to generate a window image feature;
separately inputting each window image feature into a linear classifier corresponding to the retrained neural network model for determining the preset class; and
obtaining, according to a result output by the corresponding linear classifier, a probability that each window image comprises the object image of the preset class.

6. The method according to claim 5, wherein determining, according to each obtained probability, whether the to-be-classified image comprises the object image of the preset class further comprises:
selecting a first probability with a maximum value from probabilities corresponding to the window images;
selecting a second probability with a maximum value from the first probability and a probability corresponding to the first neural network model;
calculating a weighted average of the second probability and the probability corresponding to the retrained neural network model; and
determining, according to a relationship between the weighted average and a probability threshold corresponding to the preset class, whether the to-be-classified image comprises the object image of the preset class.

7. An electronic device, comprising a memory and a processor, the memory storing instructions, which, when being executed by the processor, cause the processor to perform the following steps:
inputting a to-be-classified image into a plurality of neural network models;
obtaining data output by multiple non-input layers specified by each neural network model to generate a plurality of image features corresponding to the plurality of neural network models;
respectively inputting the plurality of corresponding image features into linear classifiers, each of the linear classifiers being trained by one of the plurality of neural network models for determining whether an image belongs to a preset class;
obtaining, using each neural network model, a corresponding probability that the to-be-classified image comprises an object image of the preset class; and
determining, according to each obtained probability, whether the to-be-classified image comprises the object image of the preset class.

8. The electronic device according to claim 7, wherein generating the plurality of corresponding image features further comprises:
obtaining vectors outputted by the multiple non-input layers specified among one or more intermediate layer and an output layer of each neural network model; and combining vectors of the multiple non-input layers of each neural network model to obtain the plurality of image features corresponding to the plurality of the neural network model.

9. The electronic device according to claim 8, wherein:
inputting the to-be-classified image into the plurality of neural network model comprises:
respectively inputting the to-be-classified image in multiple scales into each neural network model; and
combining the vectors of the multiple non-input layers further comprises:
respectively combining the vectors of the multiple non-input layers of one of the neural network models corresponding to the to-be-classified image at each scale to obtain combined vectors corresponding to the multiple scales; and
averaging the combined vectors corresponding to the multiple scales, to obtain one of the plurality of image features corresponding to one of the plurality of the neural network models.

10. The electronic device according to claim 7, wherein when being executed by the processor, the instructions further cause the processor to perform the following step:
clearing up a coefficient of an output layer of a first neural network model trained by using a first training set, adjusting the output layer to adapt to a second training set, and performing retraining, by using the second training set, to obtain a retrained neural network model.

11. The electronic device according to claim 10, wherein obtaining the corresponding probability that the to-be-classified image comprises the object image of the preset class further comprises:
traversing the to-be-classified image by using a window to extract window images and scaling the window images to a same size;
inputting each window image into the retrained neural network model and obtaining data output by the non-input layers to generate a window image feature;
separately inputting each window image feature into a linear classifier corresponding to the retrained neural network model for determining the preset class; and
obtaining, according to a result output by the corresponding linear classifier, a probability that each window image comprises the object image of the preset class.

12. The electronic device according to claim 11, wherein determining, according to each obtained probability, whether the to-be-classified image comprises the object image of the preset class further comprises:
selecting a first probability with a maximum value from probabilities corresponding to the window images;
selecting a second probability with a maximum value from the first probability and a probability corresponding to the first neural network model;
calculating a weighted average of the second probability and the probability corresponding to the retrained neural network model; and
determining, according to a relationship between the weighted average and a probability threshold corresponding to the preset class, whether the to-be-classified image comprises the object image of the preset class.

13. A computer readable non-volatile storage mediums storing computer readable instructions, which, when being executed by one or more processors, cause the one or more processors to implement an image classification method, the method comprising:
inputting a to-be-classified image into a plurality of neural network models;
obtaining data output by multiple non-input layers specified by each neural network model to generate a plurality of image features corresponding to the plurality of neural network models;
respectively inputting the plurality of corresponding image features into linear classifiers, each of the linear classifiers being trained by one of the plurality of neural network models for determining whether an image belongs to a preset class;
obtaining, using each neural network model, a corresponding probability that the to-be-classified image comprises an object image of the preset class; and
determining, according to each obtained probability, whether the to-be-classified image comprises the object image of the preset class.

14. The computer readable non-volatile storage medium according to claim 13, wherein generating the plurality of corresponding image features further comprises:
obtaining vectors outputted by the multiple non-input layers specified among one or more intermediate layer and an output layer of each neural network model; and
combining vectors of the multiple non-input layers of each neural network model to obtain the plurality of image features corresponding to the plurality of the neural network model.

15. The computer readable non-volatile storage medium according to claim 14, wherein:
inputting the to-be-classified image into the plurality of neural network model comprises:
respectively inputting the to-be-classified image in multiple scales into each neural network model; and
combining the vectors of the multiple non-input layers further comprises:
respectively combining the vectors of the multiple non-input layers of one of the neural network models corresponding to the to-be-classified image at each scale to obtain combined vectors corresponding to the multiple scales; and
averaging the combined vectors corresponding to the multiple scales, to obtain one of the plurality of image features corresponding to one of the plurality of the neural network models.

16. The computer readable non-volatile storage medium according to claim 13, wherein when being executed by one or more processors, the computer readable instructions further cause the one or more processors to perform the following step:
clearing up a coefficient of an output layer of a first neural network model trained by using a first training set, adjusting the output layer to adapt to a second training set, and performing retraining, by using the second training set, to obtain a retrained neural network model.

17. The computer readable non-volatile storage medium according to claim 16, wherein obtaining the corresponding probability that the to-be-classified image comprises the object image of the preset class further comprises:
traversing the to-be-classified image by using a window to extract window images and scaling the window images to a same size;
inputting each window image into the retrained neural network model and obtaining data output by the non-input layer to generate a window image feature;
separately inputting each window image feature into a linear classifier corresponding to the retrained neural network model for determining the preset class; and obtaining, according to a result output by the corresponding linear classifier, a probability that each window image comprises the object image of the preset class.

18. The computer readable non-volatile storage medium according to claim 17, wherein determining, according to each obtained probability, whether the to-be-classified image comprises the object image of the preset class further comprises:

selecting a first probability with a maximum value from probabilities corresponding to the window images;

selecting a second probability with a maximum value from the first probability and a probability corresponding to the first neural network model;

calculating a weighted average of the second probability and the probability corresponding to the retrained neural network model; and determining, according to a relationship between the weighted average and a probability threshold corresponding to the preset class, whether the to-be-classified image comprises the object image of the preset class.

* * * * *